United States Patent
Zellner, Jr.

(10) Patent No.: US 7,753,423 B2
(45) Date of Patent: Jul. 13, 2010

(54) COMPONENT ASSEMBLY FOR A MOTOR VEHICLE

(75) Inventor: Kerry Scott Zellner, Jr., Saline, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 335 days.

(21) Appl. No.: 11/970,688

(22) Filed: Jan. 8, 2008

(65) Prior Publication Data

US 2009/0174222 A1 Jul. 9, 2009

(51) Int. Cl.
*G12B 9/00* (2006.01)

(52) U.S. Cl. .................... 296/1.08; 248/27.3

(58) Field of Classification Search ............ 24/297; 180/90; 248/27.3, 221.11, 221.12, 222.11, 248/544; 280/752; 296/1.08, 24.34, 70; 403/326, 329, 330; 454/127
See application file for complete search history.

(56) References Cited

U.S. PATENT DOCUMENTS

| | | | | | |
|---|---|---|---|---|---|
| 1,572,003 | A | * | 2/1926 | Fleming | 126/304 R |
| 3,409,858 | A | * | 11/1968 | Krehbiel | 439/354 |
| 3,544,951 | A | * | 12/1970 | Roberts | 439/358 |
| 3,617,077 | A | * | 11/1971 | Cavanaugh, Sr. | 403/291 |
| 3,866,868 | A | * | 2/1975 | Fish et al. | 248/27.3 |
| 4,529,242 | A | | 7/1985 | Watanabe et al. | |
| 4,668,004 | A | * | 5/1987 | Tsunoda et al. | 296/70 |
| 4,717,195 | A | | 1/1988 | Okuyama et al. | |
| 4,800,980 | A | | 1/1989 | Hideo et al. | |
| 5,035,443 | A | * | 7/1991 | Kincheloe | 280/618 |
| 5,232,185 | A | * | 8/1993 | Schorr et al. | 248/27.3 |
| 5,465,049 | A | | 11/1995 | Matsuura et al. | |
| 5,699,601 | A | * | 12/1997 | Gilliam et al. | 29/278 |
| 5,707,100 | A | | 1/1998 | Suyama et al. | |
| 5,806,916 | A | | 9/1998 | Sinner et al. | |
| 5,848,855 | A | * | 12/1998 | Roossien | 403/329 |
| 5,850,996 | A | * | 12/1998 | Liang | 248/221.11 |
| 5,898,172 | A | * | 4/1999 | Masui et al. | 250/239 |
| 5,961,129 | A | * | 10/1999 | Post et al. | 280/7.13 |

(Continued)

FOREIGN PATENT DOCUMENTS

GB 2224231 A * 5/1990

*Primary Examiner*—Glenn Dayoan
*Assistant Examiner*—Paul A Chenevert
(74) *Attorney, Agent, or Firm*—Gifford, Krass, Sprinkle, Anderson & Citkowski, P.C.

(57) ABSTRACT

A component assembly for a motor vehicle includes a first component and a second component. The first component includes a main wall and a tab extending outwardly from the main wall. The tab has an aperture extending therethrough. The second component has a support wall and a tab receiver extending outwardly from the support wall. The tab receiver lockingly engages the tab to interconnect the first component and the second component. The tab receiver has an end wall and a pair of guide walls extending from opposite ends of the end wall. The guide walls are spaced apart to receive the tab therebetween. The tab receiver has a retaining member disposed between the side wall and extending outwardly from the support wall. The retaining member extends through the aperture of the tab when the tab is fully received between the side walls. The tab receiver has a rib that extends longitudinally between the retaining member and a free end of the support wall for tensioning the tab as the tab is received by the tab receiver.

9 Claims, 3 Drawing Sheets

U.S. PATENT DOCUMENTS

| | | |
|---|---|---|
| 6,062,626 A | 5/2000 | Bayer et al. |
| 6,074,150 A * | 6/2000 | Shinozaki et al. ............ 411/508 |
| 6,095,272 A | 8/2000 | Takiguchi et al. |
| 6,155,636 A | 12/2000 | Stehning et al. |
| 6,361,242 B1 * | 3/2002 | Daoud ........................ 403/329 |
| 6,364,618 B1 * | 4/2002 | Moreno ................... 416/247 R |
| 6,376,776 B2 * | 4/2002 | Akizuki ................... 174/138 G |
| 6,416,025 B1 * | 7/2002 | Urrutia et al. .......... 248/224.61 |
| 6,578,449 B1 | 6/2003 | Anspaugh et al. |
| 6,582,012 B1 | 6/2003 | Smith |
| 6,854,783 B2 * | 2/2005 | Teranishi et al. ............... 296/70 |
| 6,890,016 B2 * | 5/2005 | Brancheriau ................. 296/70 |
| 7,036,865 B2 | 5/2006 | Sato et al. |
| 7,040,686 B2 | 5/2006 | Kapteyn |
| 7,077,452 B2 * | 7/2006 | Song ........................... 296/70 |
| 7,234,763 B2 | 6/2007 | Gupta et al. |
| 7,300,102 B2 | 11/2007 | Gupta et al. |
| 7,370,500 B2 * | 5/2008 | Kapteyn ...................... 70/237 |
| 7,410,206 B2 * | 8/2008 | Koarai ................... 296/187.01 |
| 7,503,608 B1 * | 3/2009 | Shahidehpour .............. 296/29 |
| 2002/0164206 A1 * | 11/2002 | Quinn et al. ................. 403/329 |
| 2003/0015364 A1 * | 1/2003 | Ritter et al. ................... 180/90 |
| 2005/0054229 A1 * | 3/2005 | Tsuya et al. ................ 439/280 |

\* cited by examiner

COMPONENT ASSEMBLY FOR A MOTOR VEHICLE

FIELD OF THE INVENTION

The invention relates to a component assembly for a motor vehicle. More particularly, the invention relates to a fastener arrangement for attaching components of a component assembly together.

BACKGROUND OF THE INVENTION

Motor vehicles include numerous plastic molded components, such as ventilation ducts, interior panels, ornamental covers and bezels, etc. A wide variety of methods and structures are known for coupling the various plastic components in the vehicle together.

A snap feature is a known attachment structure for fixing registers, switches, or like components to panels. This feature involves a retaining shape, usually triangular, on the part to be fixed, and a tab with a slot on the panel/bezel. The tab is aligned with the retaining shape during installation and flexes over and around it until the retaining shape falls into the slot on the tab, thereby locking the two parts together. Usually, two or more of these snap features are used on opposing sides to fix the parts together. When this two-part sub-assembly is installed into the rest of the module, clearance must be left between the snap feature and surrounding parts to ensure that the snap does not catch or snag and potentially break or become disengaged during assembly. Typical assembly clearance specified by manufacturing is on the order of 7-9 mm, which is difficult to maintain in some situations. This is a large amount of wasted space between the sub-assembly and surrounding parts. Current snap systems use the general surface of the part to be fixed as a datum. The general surface, however, is difficult to adjust when the fitting between the two parts has to be changed.

It remains desirable to provide improved fastener or attachment mechanisms for coupling the various plastic components in the vehicle together, in particular, for addressing the aforementioned tolerance issues typically encountered in a vehicle assembly or production environment.

SUMMARY OF THE INVENTION

According to one aspect of the invention, a component assembly is provided for a motor vehicle. The component assembly includes a first component and a second component. The first component includes a main wall and a tab extending outwardly from the main wall. The tab has an aperture extending therethrough. The second component has a support wall and a tab receiver extending outwardly from the support wall. The tab receiver lockingly engages the tab to interconnect the first component and the second component. The tab receiver has an end wall and a pair of guide walls extending from opposite ends of the end wall. The guide walls are spaced apart to receive the tab therebetween. The tab receiver has a retaining member disposed between the side wall and extending outwardly from the support wall. The retaining member extends through the aperture of the tab when the tab is fully received between the side walls. The tab receiver has a rib that extends longitudinally between the retaining member and a free end of the support wall for tensioning the tab as the tab is received by the tab receiver.

According to another aspect of the invention, a method of assembling the aforementioned component assembly includes the step of adding or removing material from an injection mold tool used to form the tab receiver in order to reduce or increase, respectively, the height of the rib to address a tolerance stack in relation to the assembly of the first component and the second component to each other and/or to the vehicle.

BRIEF DESCRIPTION OF THE DRAWINGS

Advantages of the present invention will be readily appreciated as the same becomes better understood by reference to the following detailed description when considered in connection with the accompanying drawings, wherein.

DETAILED DESCRIPTION OF THE INVENTION

Figure 1:
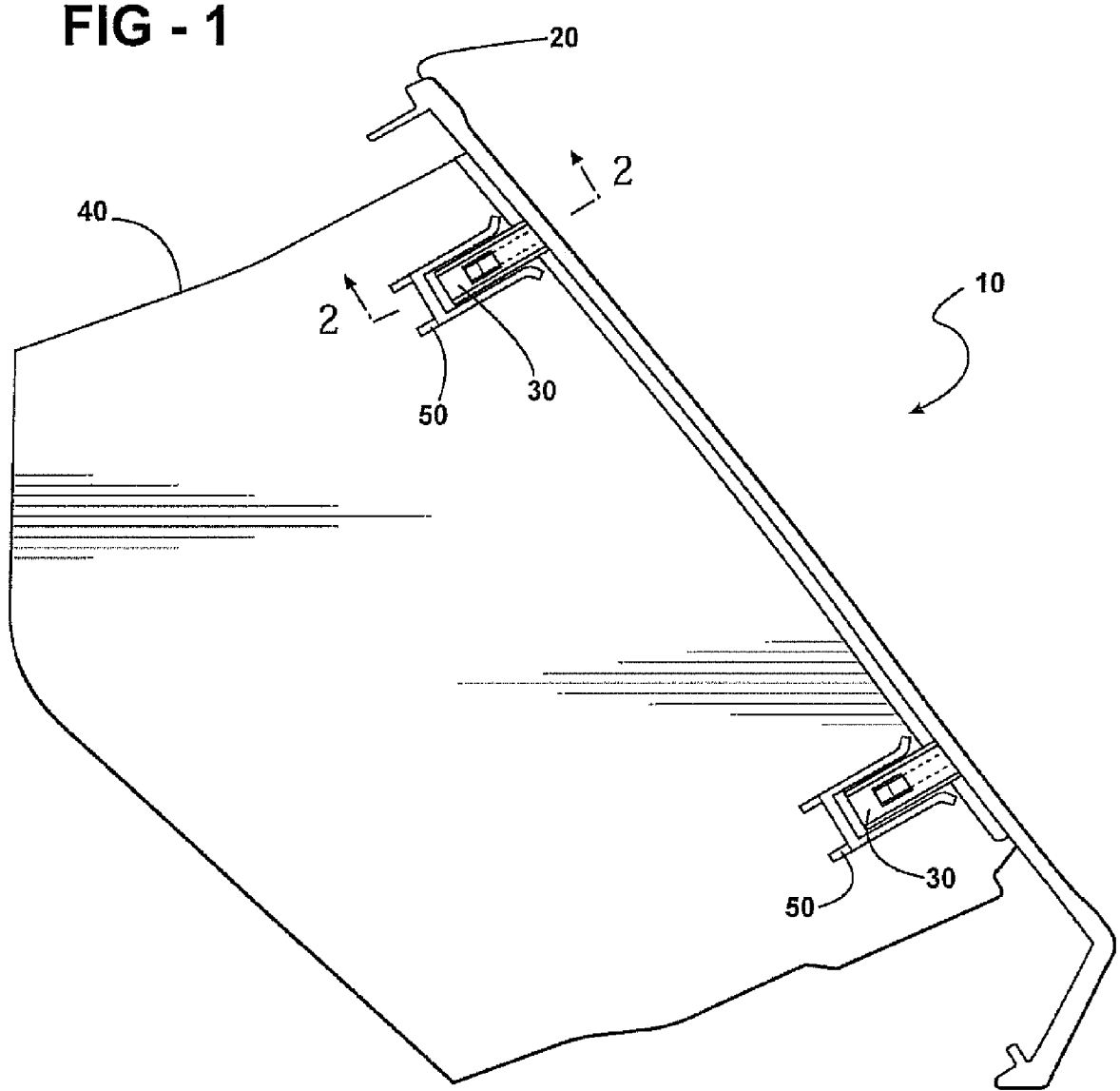
FIG. 1 is an elevational view of a component assembly according to one embodiment of the invention.
Figure 2:
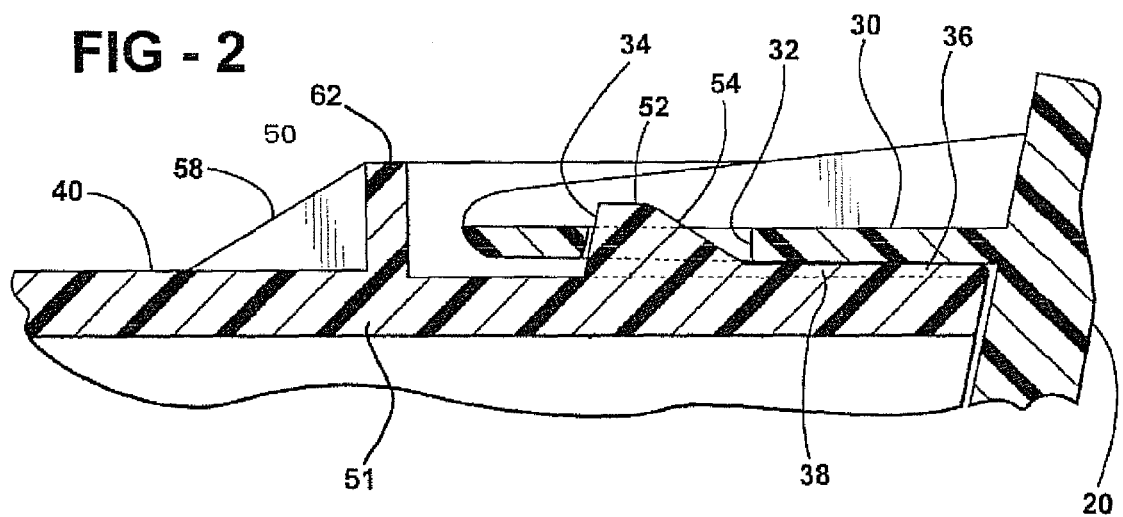
FIG. 2 is a cross sectional view of the component assembly as taken through the plane indicated at 2-2 in FIG. 1.
Figure 3:
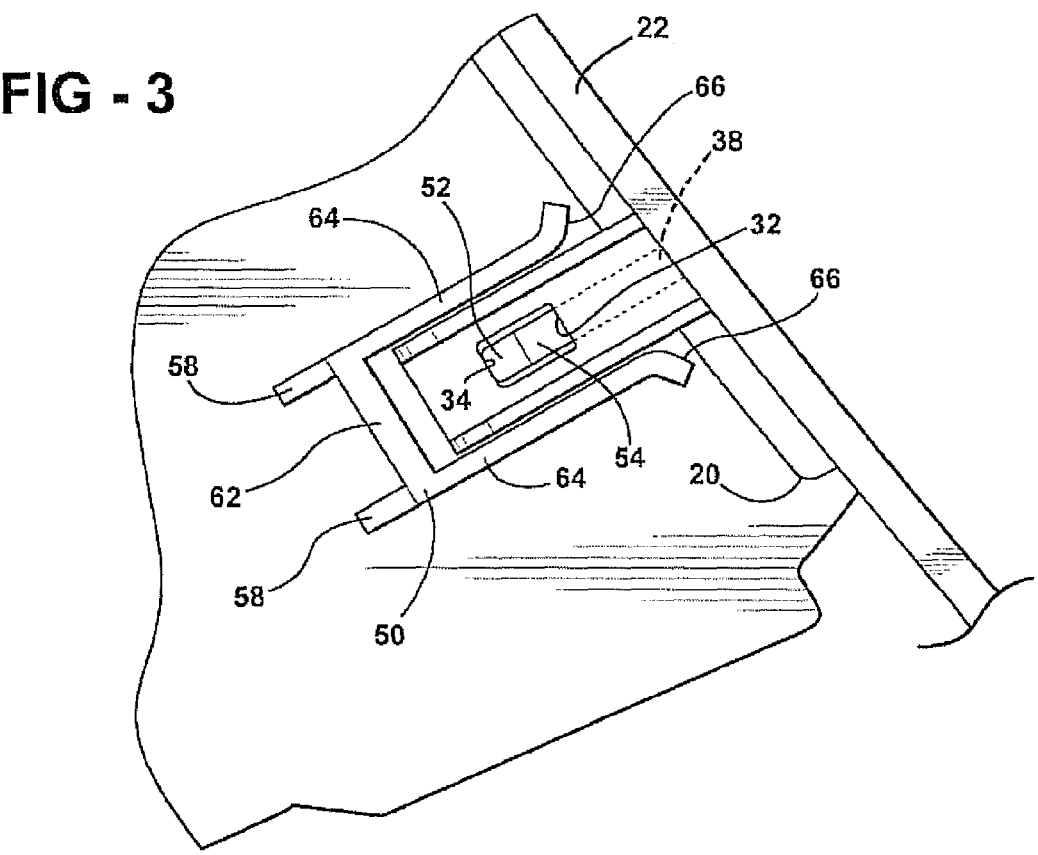
FIG. 3 is a partial elevational view of the component assembly enlarged to show locking engagement between a receiver on one component of the component assembly and a tab on another component of the component assembly.
Figure 4:
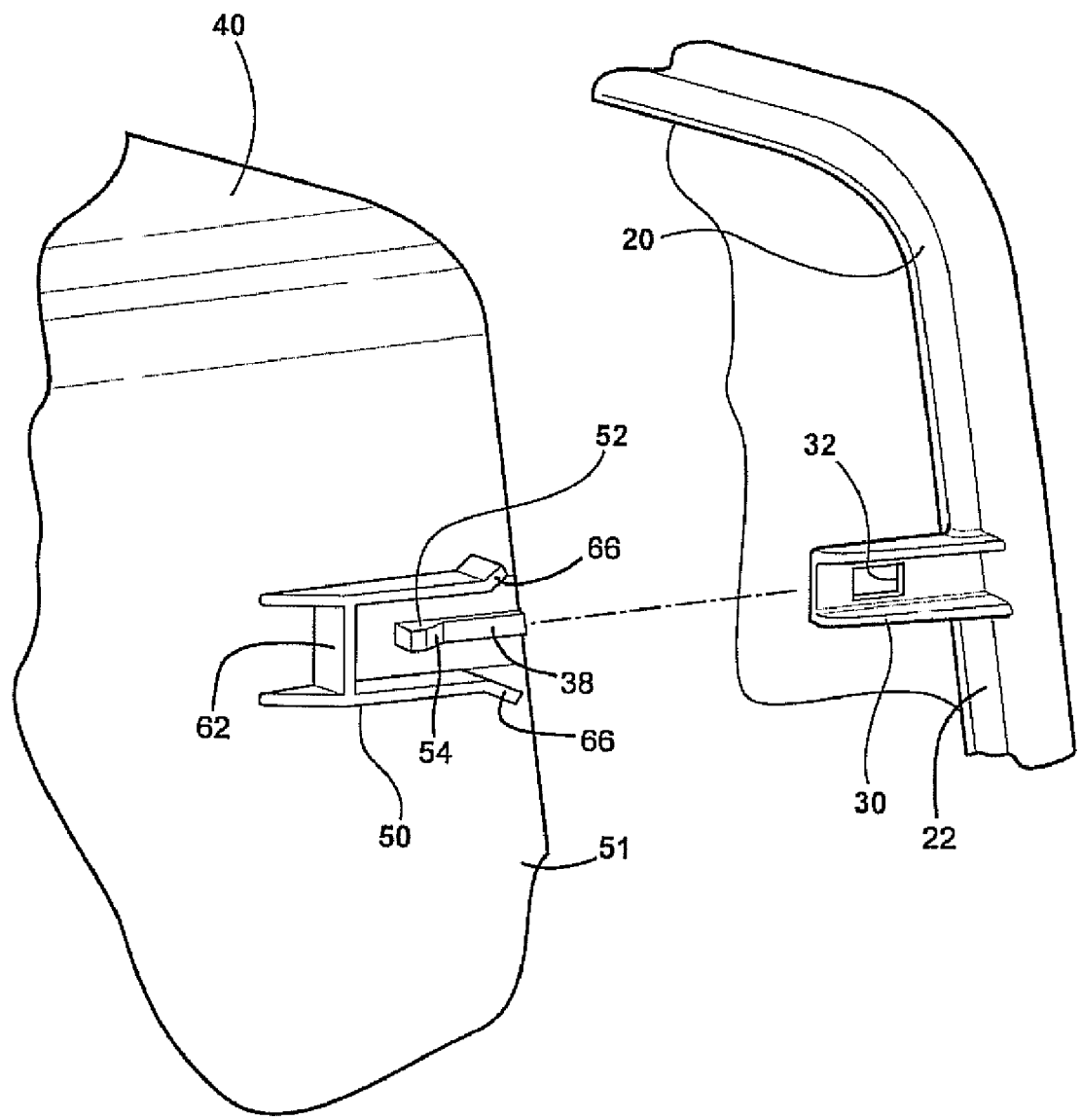
FIG. 4 is a partial exploded view of the component assembly enlarged to illustrate how the tab is received by the receiver.

Referring to the FIGS. 1-4, a component assembly for a motor vehicle is generally indicated at 10. The component assembly 10 includes a first component 20 and a second component 40. The first component 20 includes a main wall 22 and a tab 30 extending outwardly from the main wall 22. The tab 30 has an aperture 32 extending therethrough. The second component 40 has a support wall 51 and a tab receiver 50 extending outwardly from the support wall 51. The tab receiver 50 lockingly engages the tab 30 to interconnect the first component 20 and the second component 40.

The tab receiver 50 has an end wall 62 and a pair of guide walls 64 extending from opposite ends of the end wall 62 toward the first component 20. The guide walls 64 are spaced apart to receive the tab 30 therebetween. The guide walls 64 include distal ends 66 that are angled outwardly to facilitate insertion of the tab 30 into the tab receiver 50.

The tab receiver 50 has a retaining member 52 positioned between the guide walls 64. The retaining member 52 extends outwardly from the support wall 51 so as to be received through the aperture 32 of the tab 30 when the tab 30 is fully received between the guide walls 64. The tab receiver 50 has a rib 38 that extends longitudinally between the retaining member 52 and a free end of the support wall 51. The rib 38 extends outwardly from the support wall 51 for contacting the tab 30 as the tab 30 is inserted into the tab receiver 50.

The tab receiver 50 forms a boundary that protects the tab 30 and the retaining member 52 from contact with any surrounding parts during the installation of the components 20, 40 to each other. Optionally, angled guide ribs 58 may extend between the end wall 62 and the support wall 51 to form a guide shape between the assembly 10 and any surrounding adjacent module parts during assembly. The boundary formed by the tab receiver 50 also keeps a minimal clearance to the tab 30 disposed therein. The rib 38 extends from the leading edge of the retaining member 52 to the free end of the support wall 51. The tab 30 is guided by the rib 38 until it flexes over the retaining member 52 feature. After the two components 20, 40 of the assembly are connected, the rib 38 acts as a datum surface as it contacts the inside surface of the tab 30 to fix the two parts 20, 40 in a direction to be datumed. The rib 38 is typically centered inside the surrounding boundary wall defined by the tab receiver 50 and is raised a small amount above the general surface of the support wall 51 so it can be altered to adjust the fitting between the two components 20, 40.

In one embodiment, the retaining member 52 includes a ramped surface 54 for displacing the tab 30 away from the support wall 51 during insertion of the tab 30 into the tab receiver 50 and facilitating location of the retaining member 52 into the aperture 32 in the tab 30. The retaining member 52 also includes a locating surface 34 substantially normal to the support wall 51. The locating surface 34 is on an opposite side of the retaining member 52 relative to the ramped surface 54. The locating surface 34 locates the tab 30 relative to the tab receiver 50 in at least one direction.

In another embodiment, the second component 40 is formed of a plastic or resin material in an injection molding process. In production, the height of the rib 38 may be adjusted by shortening or deepening a corresponding portion of a mold in an injection molding tool to accommodate any potential tolerance condition in an assembly environment.

The invention has been described in an illustrative manner. It is, therefore, to be understood that the terminology used is intended to be in the nature of words of description rather than of limitation. Many modifications and variations of the invention are possible in light of the above teachings. For example, the first component 20 and second component 40 are illustrated as a bezel and a register, respectively, in a motor vehicle. The first and second components may also be other components or subassemblies to be coupled together in the motor vehicle, such as switches, panels and the like. Thus, within the scope of the appended claims, the invention may be practiced other than as specifically described.

I claim:

1. A component assembly for a motor vehicle, said component assembly comprising:
   a first component having a main wall and a tab extending outwardly from the main wall, the tab having an aperture extending therethrough;
   a second component having a support wall and a tab receiver extending outwardly from the support wall, the tab receiver lockingly engaging the tab to interconnect the first component and the second component, the tab receiver having an end wall and a pair of guide walls extending from opposite ends of the end wall, the guide walls spaced apart to receive the tab therebetween,
   the tab receiver having a retaining member disposed between the guide walls and extending outwardly from the support wall, the retaining member extending through the aperture of the tab when the tab is fully received between the guide walls,
   the tab receiver having a rib that extends longitudinally between the retaining member and a free end of the support wall for contacting and tensioning the tab as the tab is received between the guide walls of the tab receiver.

2. The component assembly as set forth in claim 1, wherein the guide walls are generally parallel to each other.

3. The component assembly as set forth in claim 2, wherein the guide walls include distal ends that are angled outwardly away from each other to facilitate insertion of the tab into the tab receiver.

4. The component assembly as set forth in claim 1, wherein the retaining member includes a ramped surface for displacing the tab away from the support wall during insertion of the tab into the tab receiver and facilitating location of the retaining member into the aperture in the tab.

5. The component assembly as set forth in claim 4, wherein the retaining member includes a locating surface substantially normal to the support wall for locating the tab relative to the tab receiver, the locating surface being on an opposite side of the retaining member relative to the ramped surface.

6. The component assembly as set forth in claim 1, wherein the end wall and guide walls are taller than a substantial portion of the tab to protect the tab from contact with other surrounding part during assembly of the first and second components.

7. The component assembly as set forth in claim 1, wherein the tab receiver includes at least one guide rib extending between the end wall and the support wall to form a guide shape between the assembly and any surrounding adjacent parts during assembly.

8. The component assembly as set forth in claim 1, wherein the first and second components are injection molded from a resin material in an injection mold tool.

9. The component assembly as set forth in claim 1, wherein one of the first and second components is a register and the other of the first and second components is a bezel.

* * * * *